3,082,527
PROCESS FOR MAKING DENTAL IMPRESSION MASSES

Siegfried Nitzsche and Manfred Wick, Burghausen, Upper Bavaria, Germany, assignors to Wacker-Chemie G.m.b.H., Munich, Germany, a German firm
No Drawing. Filed May 29, 1959, Ser. No. 816,716
Claims priority, application Germany Aug. 5, 1955
11 Claims. (Cl. 32—17)

The present invention relates to materials suitable for taking dental impressions, i.e. compositions for use within the oral cavity, and relates more particularly to compositions useful for taking dental impressions and having a basis of an organopolysiloxane.

The present application is a continuation-in-part application of our application Serial No. 602,081, filed August 3, 1956.

For dental purposes plaster is generally used as the impression material. However, in order to obtain accurate impressions, especially in those cases wherein the lower portion of a tooth has a smaller cross-section than its center or top, a suitable elastic material has been sought. Alginate gels and other colloids have been suggested for these purposes. With these impression materials, however, it is not possible to obtain impressions whose dimensions are exact, since these compositions when used alone are too soft and, on account of their large content of water, they shrink considerably. In view of the fact that the impression materials consisting of plaster, alginate and other compositions which have been hitherto used have certain disadvantages, attempts have been made for a long time to produce better products. Thus, it has been proposed to make impression materials from natural rubber, gutta-percha, synthetic rubber and other organic plastics, which are both elastic and strongly cohesive, but which have no adhesive properties. These materials have been utilized, when desired, in admixture with other such compositions or with the addition of plasticizers, conventional fillers and other suitable additives.

Rubber masses which are objectionable on account of their odor and their physiological pecularities, can be used only in taking impressions which involve a small section of the dental structure, i.e. only within a metal ring or dam. Even in these instances it is not entirely advisable to use rubber masses. Rigid masses usually yield better results. Likewise, attempts have been made to use elastomeric substances such as the "Thiokols." However, on account of their physiological pecularities and on account of their odor they cannot be used satisfactorily for dental purposes. Besides, these substances form soft impressions which readily change their shape. Polyacrylic acid esters and other polyvinyl compounds have also been proposed as suitably elastic, plastics materials. Although a few of these plastics possess certain particular advantages, they have been found to be unsuitable for general use, partly on account of their lack of dimensional stability as well as their odor and their physiological effects, and partly owing to the fact that their plasticizer content tends to migrate or exude and, thus, they do not yield durable impression materials for dental purposes.

Furthermore, it has also been suggested that silicones and heat-vulcanizable silicone rubber be employed for the preparation of solutions. By starting from the final polymerizates of these compositions and then adding fillers, the solutions are transferred into a mass having a permanent degree of plasticity. This mass can be used directly for taking impressions without the necessity of a further treatment or chemical conversion, and can be re-used at any time for obtaining a new impression. Apart from the fact that no commercially feasible or practical method for carrying out this process has been disclosed, it is plain that an accurate impression cannot be obtained with such plastic masses, because their dimensions and shape are changed upon the slightest mechanical action or stress. Such mechanical action or physical stress cannot be avoided and always occurs when the cast or impression is taken from the mouth after it is formed. Furthermore, when storing impressions so obtained their form will be gradually altered on account of the inherent plastic flow of the material. Such alteration in their form and shape occurs during movement or when inserted, under pressure or when subject to other shocks. Thus, heat-vulcanizable silicone rubbers have been unsuitable for use in dentistry for taking dental impressions since these impressions had to be vulcanized afterwards at elevated temperatures and therefore an exact reproduction could not be obtained.

Surprisingly, the partially polymerized condensation products which yield cold-hardenable silicone elastomers have been found to be excellent materials for the manufacture of durable dental impressions which assure the utmost in dimensional precision. Their suitability arises from the unexpected observation that when suitably combined with cross-linking agents and a catalyst these masses can be caused to harden to form products similar to soft rubber not only at room temperature, but that they can be made to do so in a sufficiently short time, so that they are stable dimensionally and can be removed even in a few minutes. Certain cold-curing masses of this type have been disclosed in United States application Serial No. 602,081 filed August 3, 1956, but not all are suitable for the taking of dental impressions in the oral cavity.

The possibility that these impression materials could be employed in the process of this invention is highly surprising. In view of the prior art it could have by no means been anticipated that such cold-curing silicone rubber masses would be impression materials that could be used for dental purposes. Although cold-curing silicone rubber compositions have been known and used, particularly for coating textiles or in the form of liquid molding compositions, such silicone masses, however, are not suitable for taking dental impressions, because the solidification to an elastic cure requires several hours and the acceleration of this curing process is possible only if the material is heated to temperatures of about 150° C.

When the above-mentioned organopolysiloxane materials are employed, in accordance with this invention, for the manufacture of dental impressions the chemical conversion from a material of low initial molecular weight into a solid elastic body having a substantially increased molecular weight takes place in the oral cavity and within a matter of but a few minutes. It is surprising to note that the chemical conversion into a polymer having a substantially increased molecular weight takes place in the mouth within a few minutes and without the occurrence of any unpleasant sensation of warmth, whereas many analogous reactions do take place only under strong exothermic conditions. It is also surprising that the increased amount of the curing agents employed in this process does not cause any irritation in the mouth nor is the taste or odor disagreeable, whereas ordinarily the majority of chemical products have all of these disadvantages and therefore are not suitable for use in the mouth. Likewise, it was also quite surprising to find that the chemical reaction taking place in the mouth and leading to the formation of a solid and elastic body is not deleteriously affected by the moisture present in the oral cavity. Thus, the possibility of employing the organopolysiloxane compositions as dental impression masses in accordance with the present invention was by no means obvious, since the starting materials used are certain organopolysiloxanes which are not at their final state or degree of polymerization and therefore are syrupy, greasy and rather adhesive materials having a viscosity at best of 15,000 to 35,000 centipoises. In their initial partially condensed state these masses have the property of sticking so strongly to the saliva-covered walls of the oral cavity that they cannot be removed even by the most intense cleaning. Therefore, it was quite surprising to find that the organopolysiloxanes employed according to this invention in spite of this apparently highly disadvantageous property which seems to make it absolutely unsuitable for use in the mouth, can in its solidified condition be removed from the walls of the oral cavity without any difficulty. This was most surprising, since the known uses of the usual cold-hardening silicone rubbers in the form of pastes for coating textiles are based essentially on the degree of adhesion of these pastes after solidification. Finally, it should be noted that the organopolysiloxane compositions used which in the mouth turn into a strongly polymerized condition within a few minutes, are formed with organopolysiloxanes which on account of their strong reactivity absolutely cannot be stored nor are they resistant to chemical reactions. On this basis the very essential requirements for practical use as dental impression material seemed to be lacking. During a period of storage of practically one year and constant use it has been found, however, that the dental impression materials of this invention can be stored very well and are very resistant to chemical reactions, facts which were indeed quite surprising.

In accordance with this invention, the compositions which are employed in taking dental impressions consist essentially of a substantially difunctional, linear, not resinous organopolysiloxane of the general structural formula

$$XO-SiR_2-(O-SiR_2)_n-O-SiR_2-OX$$

wherein R represents an alkyl or aryl radical, X is hydrogen or R and $n$ has a value of at least 50 in combination with an organic silicon compound containing reactive groups so that the latter serves as a cross-linking agent and with a curing or condensation catalyst which is effective at room temperature. In the process of this invention the cross-linking agent is used in amounts of from 0.1% to 25% and preferably of from 0.5% to 10% by weight of the difunctional siloxane, with the catalyst being added in amounts of from 0.1% to 5% by weight of the difunctional siloxane.

The cross-linking agents which are preferably used are difunctional or polyfunctional organic or organosilicon compounds, such as:

(1) Organopolysiloxane resins having a functionality of more than 2, preferably more than 2.5, particularly those having a content of alkoxy groups;

(2) Organohydrogenpolysiloxanes of the formula

$$YSiH(R)-O-[SiH(R)-O]_n-SiH(R)Y$$

wherein Y is a reactive group such as is defined below under (4);

(3) Hydrolysis and alcoholysis products of silicon chloroform;

(4) Silanes of the formula $R_mSiY_{4-m}$ wherein Y is a reactive group, e.g. an oxy, alkoxy, aroxy or amino group, and $m$ has a value of from 0 to about 1.5;

(5) Tetraalkoxysilanes, preferably tetraethoxysilane;

(6) Alkyl polysilicates, preferably ethyl polysilicate.

Further cross-linking agents that can be used are reactive silicic acid products, i.e. those having reactive groups, especially groups present on the surface, such as oxy and alkoxy radicals, or hydrogen atoms on the silicon atoms. Such silicic acid products may be obtained, e.g. by superficial esterification, by treatment with silicon chloroform or organohydrogensilanes or -siloxanes, by burning silicon tetrachloride in hydrogen or by hydrolysis of silicon chloroform.

Furthermore, titanium alkyl esters, such as butyl titanate, can also be used as cross-linking agents.

According to the invention, the following curing catalysts are suitable: condensation catalysts, such as metal salts of organic acids, especially carboxylic heavy metal salts, such as dibutyltin dilaurate and dimaleate, tin, lead or zinc octoate, metal chelates, metal oxides, such as lead oxide, organometal compounds or inorganic and organic acids, such as boric acid and oleic acid, or organic bases, for instance aliphatic cycloaliphatic, aliphatic-aromatic, aromatic and aryl-aliphatic amines, such as triethnol, dipropyl, dibutyl, dihexyl amine, benzyl and phenylethyl amine, polyethylene imine, piperidine, etc.

The organopolysiloxanes can be combined with the cross-linking agent and catalyst in any sequence. The curing components can be added to the organopolysiloxane masses in the form of a liquid mixture per se or in admixture with other additives; they can be added separately one after the other or together with fillers in the form of a paste. The alkyl silicate component can be added to the organopolysiloxane mass directly as such or together with fillers and the alkyl metal soaps can be added separately as such or together with fillers in the form of a liquid or a paste before taking the impression.

The above-described method can easily be carried out in practical fashion and yields compositions of elastic, rubberlike character which solidify rapidly, resist heat and cold and retain their shape, and are insensitive to moisture. The new pastelike dental impression materials used in accordance with this invention can be kneaded, spread or cast, have no odor, do not change their color and are physiologically inert and do not harm the muscous membrane in the oral cavity. They are much better suited for taking dental impressions rapidly than the dental impression materials hitherto used, because when using them even the gingival tooth sections can be reproduced quite naturally and with the utmost in dimensional precision. The impressions thus obtained retain their shape and are stable in colume. They also retain their temperature resistance and elasticity even during prolonged storage and the impression can be used repeatedly for casting without the occurrence of appreciable shrinkage. Thus, the advantage of the dental impressions prepared according to the invention are the following: they are of outstanding dimensional stability and are so elastic that after curing they can be removed from even the most inaccessible points; even after complete deformation they resume and return to the original shape which they assumed during the cold-curing and solidification in the mouth. They adhere sufficiently to the bowl in which they are mixed together, but separate easily from the walls of the oral cavity without formation of joints and can be used as a mold, for instance, with plaster of any type or they can be used with casting cement or amalgam. The compositions utilized in accordance with this invention offer numerous unexpected advantages to the dental profession which cannot be obtained with the many dental impression materials hitherto known.

As dental impression materials, the organopolysiloxane compositions can be used as such according to this invention without further additives; this is preferred if the impressions are to be taken without applying pressure. However, in order to obtain economically feasible, technically suitable, satisfactory impression materials, the sirupy organopolysiloxane compositions are mixed with fillers and extended with known inorganic or organic materials. Examples of well-suited substances of this kind are: powdered or washed dry kaolin, asbestos powder, calcined anhydrous plaster, various sorts of chalk, chalk containing silicic acid, kieselguhr, diatomeceous or infusorial earth, sulphur, quartz powder, stone powders of all kinds, e.g. slate powder, titanium dioxide, zinc oxide etc. Precipitated inorganic fillers, such as magnesium or calcium silicate, and calcium carbonate may likewise be employed. In some cases basic metal oxides, such as zinc oxide, are to be preferred, if desired, admixed with inert fillers, such as quartz powder, etc.

Many other fillers are useful. Examples of materials that may likewise be employed are carbon black, graphite, medical charcoal and metal powders, such as of aluminum or copper. Examples of organic substances that can be used are dextrine, starch, cellulose and its derivatives, such as its esters or glycolates; alginates, pectins or polyacrylic salts; resinous materials, such as polyvinyl ether or polyethylene resins. Emulsifiers or wetting agents, for instance addition products of fatty alcohols and ethylene oxide, can also be used. Generally, all these additives must be present in the form of pastes or powders, and their fineness should preferably be more than sufficient to pass through a screen of 300 mesh/cm.$^2$.

By use of such materials it is possible, for instance, to alter the characteristics of these impression materials. By adding zinc oxide, an impression material especially well suited for the manufacture of impressions of copper rings, etc., is obtained.

Furthermore, it is possible to dye the organopolysiloxane compositions with pigments or soluble dyestuffs, or alternatively to dye the liquid curing agents which are employed in the form of a paste in combination with fillers. This latter manner of operation is an excellent means for controlling the addition of curing catalysts and enables one to obtain a homogenous mixture by observing the degree of homogeneity of the color. Apart from the metal powders mentioned above, ferrous oxide or cadmium red can be used as pigments. Among the soluble organic dyestuffs only a small number can be used, i.e. those substances which are known to be satisfactory for use as food colors. Only the fat-soluble dyestuffs can advantageously be employed.

The admixture of the difunctional siloxanes which may contain fillers, plasticizers, pigments, flavoring agents and dyestuffs as well as other additives, e.g. anti-ageing agents, with the cross-linking agent and the curing catalyst takes place shortly before the mixture is used. Examples of flavoring agents that may be used are peppermint oil, camomile and cumorine essence; as a disinfectant parachloro-metacresol may be employed.

The composition of these dental impression materials may vary widely. The preferred compositions contain the following combinations of cross-linking agents and curing catalysts:

(1) H-siloxane and silicon chloroform ester together with organic metal salts, organic acids or amines as catalysts.
(2) Tetraalkoxysilanes together with amines or metal salts as catalysts.
(3) Tetraalkoxysilanes together with metal salts as catalysts and an active fillers as curing accelerator.
(4) The above combinations together with organic plastic materials.
(5) Cold-curing silicone rubber combinations together with non-exuding synthetic plasticizers.

In the combinations under (1), if H-siloxanes are employed as cross-linking agents, the catalysts employed are preferably organic or organometal compounds, particularly organotin compounds. Preferred organotin compounds are: dibutyltin dilaurate, dibutyltin monolaurate, dibutyltin diacetate, and dibutyltin monoacetate. Which catalyst should be used depends on the viscosity of the starting siloxane and on the content of filler present. Generally, it can be said that the acetates are more reactive than the laurates, and that the monoacetates and monolaurates are somewhat more reactive than the corresponding dilaurates and diacetates.

The organic bases, such as dibutyl amine and triethanol amine may also be employed. These bases, however, act more slowly as catalysts than the above tin compounds. In these cases the preferred cross-linking agents are H-siloxanes in which at least one hydrogen atom is present per silicon atom. In the molecule of the H-siloxane at least three hydrogen atoms should be present; preferably, however, H-siloxanes are used which contain at least 30 hydrogen atoms in the molecule chain. Cyclic hydrogen siloxanes, such as the tetramethylcyclotetrasiloxane, may likewise be employed; they are, however, less reactive than the chainlike alkyl- or arylhydrogensiloxanes.

Other cross-linking agents that can be used are the hydrolysis and alcoholysis products of silicon chloroform. The hydrolysis products of silicon chloroform are white powders which are available in commerce as the silicon hydroxy hydrides. These silicon hydroxy hydrides in these compositions can act simultaneously both as fillers and cross-linking agents. However, they are less reactive than the liquid alcoholysis products of silicon chloroform such as, for example, tributoxy silane, which has a very rapid cross-linking effect. Trialkoxysilanes and triaroxysilanes have about the same reactivity as the chainlike H-siloxanes, but they are more difficult to prepare and not as stable as the H-siloxanes. However, the advantage they have over the H-siloxanes is that when the impression obtained is filled with certain kinds of plaster immediately after hardening the cast is obtained in a form completely free of bubbles.

(2) If a tetraalkoxysilane is used instead of H-siloxane as the cross-linking agent, the same applies regarding the catalysts which has been said under (1) with respect to the H-siloxanes. Relatively speaking as to activity the organotin compounds are more effective than the amines, the acetates more effective than the laurates, and the mono compounds are more effective than the di compounds. The use of the tetraalkoxysilanes is of special advantage, if one wishes to be certain that the casts obtained will be completely free of voids and bubbles.

Regarding the effectiveness of the tetraalkoxysilanes it should be noted that the speed of vulcanization is a function of the molecular weight of the silane and the alcoholic radical in the silane. Monomeric silanes result in a quicker reaction than dimeric or polymeric silanes. Among the silanes of the simple alcohols tetramethoxysilane is the most reactive cross-linking agent; it acts about ten times more rapidly than tetraethoxy silane and 100 times more rapidly than tetraoctoxysilane. Thus, for dental purposes tetramethoxysilane would be considered to be first choice. However, since it is considered to be a rather toxic substance, silanes containing other alcoholic radicals are preferred.

Silanes whose alcoholic radicals are derived from phenols also react quickly; however, since in these cases caustic burns may occur on placing such an impression material in the mouth, these silanes likewise are preferably avoided.

Silanes of ether alcohols, such as silanes of methyl glycol, react extraordinarily quickly. Compared to tetramethoxysilane, tetraaroxysilanes and H-siloxanes, however, they have a rather bitter taste. Besides, when using these silanes the disadvantage is observed that the vulcanization proceeds rapidly at the beginning but slows down more and more towards the end of the reaction. Therefore, the "pot time" of such masses is so short that one is hardly able to introduce the mass into the patient's mouth while it is still in a plastic and flowable condition. Furthermore, the patient must then retain the mass in his mouth for a rather long time, because towards the end the vulcanization reaction proceeds rather slowly.

Attempts to mix the silanes of ether alcohols with tetraalkoxysilanes in order to alter their setting characteristics were not successful. Surprisingly, however, it has been found that when using mixed tetraalkoxysilanes this difficulty was not encountered. A silane, for instance, that had been obtained by re-esterifying 1 mol tetraethoxysilane with 2 mols of methyl glycol, results in a cross-linking agent which has no bitter taste and although it retains a long "pot time," it subsequently undergoes rather quick vulcanization in the mouth.

(3) As already mentioned above, the usual organic tetraalkoxysilanes aside from those of methanol, phenols and ether alcohols frequently are found to react too slowly as cross-linking agents to be entirely satisfactory for dental impression materials. It has been found, however, such normal tetraalkoxysilanes, especially tetraethoxysilane, can be used without this difficulty arising, if active fillers are employed which act as additional vulcanization accelerators. Regarding the effectiveness of the cross-linking catalysts the same applies that has been said in connection with (1) and (2). Fillers having such an accelerating effect are esentially strongly basic materials, such as zinc oxide, magnesium oxide and calcium carbonate. Other basic fillers in general are not used on account of their undesired physiological peculiarities, although they would be effective; examples of them are oxides of alkali metals, cadmium oxide and mercury oxide. Calcium sulfate in the form of boiled plaster is likewise suitable. When using these fillers, either exclusively or in some instances admixed with inert fillers, such as quartz powder, kieselguhr, siliceous chalk, diatomaceous earth, etc., tetraethoxysilane can be used as cross-linking agent; in this case, however, the more reactive cross-linking catalysts, such as dibutyltin diacetate or dibutyltin monolaurate, are generally preferred.

(4) The use of cold-vulcanizing silicone rubber masses is rather limited due to the high cost of silicone rubber. It has been found that diluting such masses, for instance with conventional high-boiling solvents or synthetic plasticizers is not feasible in most cases, because these diluents rapidly exude from the mass, even if they are thoroughly mixed with a filler to yield a paste before adding them to the silicone rubber. Besides, some plasticizers prevent curing. It has been found, however, that cold-vulcanizing silicone rubber masses when mixed with plastic materials, particularly vinyl polymers, are not only compatible with these materials, but that the plasticizers contained in the organic polymers do not exude from the mixtures thus obtained. Especially suitable as an extending agent is polyvinyl chloride, particularly in the form of a paste.

(5) After lengthy tests among the numerous materials available some synthetic plasticizers have been found which do not exude even without the addition of these powdered plastic materials such as the vinyl polymers. Plasticizers which can be used per se, which are compatible with the silicone rubbers and which do not exude from the final vulcanizates even after prolonged storage, are primarily the so-called polymer plasticizers, particularly the polymer plasticizers having a basis of adipic acid, and the chlorinated diphenyls which have a higher degree of chlorination (these chlorinated diphenyls are commercially available under the name "Clophen,") as well as polyesters of phthalic acid with polyvalent alcohols, e.g. the phthalic acid ester of ethylene glycol. The latter have been found to be the most desirable and effective.

Dental impression materials blended with the above plasticizers actually have better mechanical properties if they have been cured with H-siloxane. However, the mechanical properties of materials cured with the preferred tetraalkoxysilanes are also completely satisfactory. Regarding their solidity and elasticity, they are still highly superior to the conventional dental impression materials which comprise alginates. The above-mentioned plasticizers do not exude from the vulcanized silicone rubber even after storage for fourteen days. The impressions obtained therefore have the same dimensional stability as impressions obtained with pure silicone rubber, but owing to their low price they can readily replace the alginate materials which are not dimensionally stable.

From the quantitative point of view, too, the compositions can be varied within a wide range. If relatively small amounts of the composition are used for dental impressions, it is very time-consuming to compound the individual components forming the organopolysiloxane masses described for each single use or application. With the dental impression materials employed according to this invention it is possible to get the right mixture and proportions for the use desired by adding together two identical volumes of two separate pastes or two pieces of identical length extruded from a collapsible tube. In preparing the desired mixture it is also possible to use a dosing scale or chart having graduations or proportions which shows very clearly the proportion of curing agent required for any quantity of organopolysiloxane present alone or as a mixture with additives. Such charts or dosing scales are very useful in connection with collapsible tubes, since each substance is always discharged through an opening of identical size, thus enabling a very exact proportioning since quantity is a fixed function of the length of the rod discharged. Such a dosing scale e.g. may be fixed to or inscribed on a glass plate used for mixing or on the wall of a mixing vessel.

The mixtures according to the invention are introduced into the mouth in conventional manner, e.g. by means of a spoon or a spatula. After about 5 to 10 minutes, calculated from the moment of mixing, the composition solidifies to an elastic state and can be removed without any change in its shape even from such areas in the mouth where the upper portions of the teeth have a larger cross-section than the base.

The following examples illustrate the invention:

*Example 1*

100 grams of a dimethylpolysiloxane (viscosity 30,000 centistokes) were mixed on a three-roller mill with 70 grams of kieselguhr and 30 grams of powdered mica. To 10 grams of the mixture there were then added 3 grams of a polyethyl silicate containing 50% of ethoxy groups, and also 0.5 gram of dibutyltin dilaurate, whereupon the consistency of the mass slowly increases. After about 6 minutes the somewhat thickened mass can be used, for example, in denistry by placing it on a spoon and inserting it in the mouth. The patient then bites into the pasty mass and keeps it in his mouth for about 10 minutes. The fully vulcanized impression is then removed from the mouth.

*Example 2*

1 part of a homogenous mixture consisting of equal proportions of dimethylpolysiloxane of a sirupy condition (viscosity 23,000 centistokes) and zinc oxide white is mixed with 0.1 part of a homogenous mixture of tetraethyl polysilicate and dibutyltin dilaurate in a ratio of 1:3, until a homogenous mixture is obtained which is used to take an impression in the mouth. About 8 minutes after addition of the mixture of cross-linking agent and catalyst the composition has solidified to an elastic state and may be removed even from wrinkled parts of the oral cavity without changing its shape.

*Example 3*

1 part of the polysiloxane according to Example 2 is homogenously mixed with 0.15 part of a liquid homogenous mixture of 0.35 part of tetraethyl polysilicate and 0.65 part of dibutyltin dilaurate, and the obtained mixture is used for taking an impression according to Example 2. After having been in the patient's mouth for about 4 minutes the composition has solidifed to a suitable impression.

*Example 4*

1 part of the methylpolysiloxane according to Example 2 is mixed homogenously with 0.45 parts of a paste consisting of 0.8 part of dibutyltin dilaurate, 0.2 part of tetraethyl polysilicate and 1 part of kaolin elutriated and dried at 100° C. Then an impression is taken as described in Example 2. Solidification of the composition in the mouth is finished after about 5 minutes.

Example 5

1 part of the siloxane paste according to Example 2 is mixed with 0.02 part of dextrine, and the mixture is homogenously mixed with 0.15 parts of the liquid curing agent according to Example 3. Then an impression is taken according to the manner described in Example 2. The composition remains in the patient's mouth for about 4 minutes.

Example 6

100 grams of the mass described in Example 1 are mixed with 1 gram of a methylhydrogenpolysiloxane (viscosity 100 centistokes) and 1 gram of dibutyl amine, whereupon vulcanization takes place in 3 minutes at room temperature under the conditions described in Example 1.

Example 7

100 grams of a dimethylpolysiloxane (viscosity 200,000 centistokes) are mixed on a roller mill with 200 grams of zirconium silicate. To 10 grams of this mass 2 grams of a methylsilicone resin in which the R:Si ratio is 1.2:1 and which contains 15% of free hydroxyl groups, and 1 gram of dibutyltin dilaurate are added, whereupon vulcanization takes place in 15 minutes under the conditions described in Example 1. Vulcanization is not accompanied by any shrinkage.

Example 8

A polymer of 30,000 centistokes is obtained by polymerizing a dimethylsilicone oil by means of a phosphorus-nitrogen compound as described in U.S. Patent 2,830,967. To every 100 grams of polymer 50 grams of kieselguhr and 4 grams of methylhydrogenpolysiloxane are added to form an impression material which is then vulcanized by adding 2% of dibutyltin dilaurate. Vulcanization takes place at room temperature within 2 minutes. The vulcanizate is non-tacky.

Example 9

By polymerizing an octamethylcyclotetrasiloxane with 0.05% of potassium hydroxide at 150° C. a polymer is obtained having a viscosity of 30,000 centistokes. The polymer is dissolved in toluene, ethanol is then slowly added while stirring well, until about 10% of the polymer has precipitated as an insoluble substance. Precipitation with ethanol is then continued until about 70% of the polymer has settled out. This fraction (viscosity: 18,000 centistokes) is then mixed as described in Example 8 with 50 grams of kieselguhr and 4 grams of methylhydrogenpolysiloxane for every 100 grams of polymer, and the product then vulcanized by adding 2% of dibutyltin dilaurate. After 3 minutes at room temperature a non-tacky vulcanizate is obtained.

Example 10

100 parts of hydroxy-endblocked dimethylpolysiloxane (viscosity: 20,000 centistokes) are milled on a three roller mill with 50 parts of kieselguhr (commercial product "Celite Superfloss") and 4 parts of methylhydrogenpolysiloxane. If 10 parts of this mass are mixed with 0.2 part of dibutyltin diacetate and the catalyst is stirred in uniformly, the mass solidifies within 3 minutes. If 0.2 part of dibutyltin dilaurate are added to 10 parts of the basic mass, the composition solidifies within 5 minutes. When using dibutyltin monolaurate, solidification takes place already after 4 minutes. If 10 parts of the basic mass are mixed with 1 part of colloidal sulphur and 0.2 part of dibutyltin monolaurate, solidification is obtained after 4 minutes. 1 part of colloidal sulphur can be added to these masses.

Example 11

100 parts of the polymer according to Example 6 are milled on a three roller mill with 70 parts of silicon hydroxy hydride. If subsequently 0.3 part of dibutyltin monoacetate are added to every 10 parts of this mixture, solidification is obtained after 5 minutes. If 0.5 part of dibutyl amine are added to 10 parts of the mass, solidification takes place after 8 minutes.

Example 12

To 10 parts of the starting mass according to Example 6 (silicone polymer+"Celite Superfloss") 0.2 part of a mixture consisting of triisopropoxysilane and dibutyltin dilaurate in a ratio of 1:1 are added. Vulcanization takes place within 4 minutes. The mass thus obtained may be filled up with plaster without the formation of bubbles. If 0.1 part of triisopropoxysilane are added to 10 parts of the same mass and vulcanization is then carried out by adding 0.1 part of dibutyltin dilaurate, the same result is obtained.

If one attempts, however, to vulcanize the basic mass mixed with triisopropoxysilane after a storage period of 3 days by means of adding dibutyltin dilaurate, no vulcanization takes place, because while being stored in the basic mass the triisopropoxysilane is destroyed. The same occurs if considerably larger amounts of triisopropoxysilane are added. Therefore, when using alcoholysis products of silicon chloroform it is not possible to incorporate the cross-linking agent in the basic mass, as it is possible with H-siloxanes and the hydrolysis products of silicon chloroform.

Example 13

100 parts of a hydroxyl endblocked dimethylpolysiloxane (viscosity: 17,800 centistokes) are milled on a three roller mill with 45 grams of kieselguhr (commercial product "Celite Superfloss") and 5 grams of calcium carbonate (commercial product "Socal").

If 0.2 gram of a mixture of tetramethoxysiloxane and dibutyltin dilaurate in a ratio of 1:1 are added to 10 grams of this mass, vulcanization is obtained within 3.5 minutes, the "pot time" being 120 seconds.

If 0.2 gram of a mixture consisting of tetraethoxysilane and dibutyltin dilaurate in a ratio of 1:1 are added to 10 grams of this mixture, the "pot time" is 20 minutes and solidification takes place in 35 minutes.

If 0.2 gram of a mixture of tetraoctoxysilane and dibutyltin dilaurate in a ratio of 1:1 are added to 10 grams of this basic mass, solidification is obtained within 7 hours, the "pot time" being 60 minutes.

If 0.2 gram of a mixture of hexaethoxydisiloxane and dibutyltin dilaurate in a ratio of 1:1 are employed for curing 10 grams of the basic mixture, a "pot time" of 6 minutes and a solidification time of 12 minutes are obtained.

If 0.3 gram of a mixture of tetramethoxysilane and dibutyl amine in a ratio of 1:1 are employed for curing 10 grams of the basic mixture, solidification is obtained within 11 minutes, the "pot time" being 4 minutes.

When using 0.2 gram of a mixture of dibutyltin dilaurate and the monomeric tetraalkoxysilane of methyl glycol in a ratio of 1:1 for curing 10 grams of the basic mixture, solidification is obtained within 8 minutes, the "pot time" being 60 seconds. If, however, a mixture of dibutyltin dilaurate and a tetraalkoxysilane of 2 mols of ethanol and 2 mols of methyl glycol in a ratio of 1:1 is used for curing 10 grams of the basic mixture, solidification is obtained within 4.5 minutes, the "pot time" being 3 minutes.

Example 14

100 grams of a hydroxyl endblocked dimethylpolysiloxane (viscosity: 25,000 centistokes) are milled on a three roller mill with 60 parts of zinc oxide. To 10 grams of this mass 0.2 gram of a mixture of dibutyltin diacetate and tetraethoxysilane in a ratio of 1:1 are added. Solidification takes place within 4 minutes, the "pot time" being 120 seconds.

Example 15

100 parts of a polysiloxane according to Example 14 are mixed with 50 parts of calcium carbonate and 20 parts of quartz powder. Then 2 parts of a mixture of dibutyltin monoacetate and tetraethoxysilane in a ratio of 1:1 are added, whereupon solidification is effected within 6 minutes, the "pot time" being 2.5 minutes. The same result is obtained, if the calcium carbonate is replaced by magnesium oxide or boiled plaster.

Example 16

70 grams of a hydroxyl endblocked dimethylpolysiloxane (viscosity: 16,800 centistokes) are mixed with 50 grams of a polyadipinate plasticizer known under the commercial name "Ultramoll II" and 120 grams of quartz powder. If 10 grams of this mixture are mixed with 0.2 gram of a mixture of dibutyltin diacetate and tetramethoxy silane in a ratio of 1:1, the product solidifies after a "pot time" of 2 minutes within 5.5 minutes.

Equivalent results are obtained, if "Ultramoll II" is replaced by the adipic polyester "Scadoplast RA 3 L" or by the phthalic acid ethylene glycol ester plasticizer "CEL" or by the phthalic acid polyester "Scadoplast W 1" or by the chlorinated diphenyl "Clophen A 60." In these cases, too, the curing can be carried out with H-siloxane. To 100 grams of the above basic mixture just 2 grams of methylhydrogenpolysiloxane and 2 grams of dibutyltin dilaurate would have to be added in order to get solidification within 5 minutes, the "pot time" then being 2 minutes.

Example 17

100 grams of a dimethylpolysiloxane (viscosity: 30,000 centistokes) are mixed with 50 grams of calcined diatomaceous earth on a rolling mill. Subsequently this silicone mixture is mixed in a ratio of 1:1 with a polyvinyl chloride paste consisting of 70 grams of powdered polyvinyl chloride, 25 grams of diamyl phthalate and 5 grams of dibutyltin dilaurate. To 10 grams of this mixture then 2 grams of methylhydrogenpolysiloxane (viscosity: 150 centistokes) are added, whereupon solidification is effected within 6 minutes. During solidification neither shrinkage nor an exuding of plasticizer is observed. In the present case it is of special advantage that the dibutyltin dilaurate which is used as condensation accelerator for the cross-linking of the silicone mass at the same time is an excellent stabilizer for the polyvinyl chloride.

We claim:

1. A process consisting essentially of preparing a mixture comprising a partially polymerized, difunctional, linear liquid organopolysiloxane having the general formula $$XO\text{---}SiR_2\text{---}(O\text{---}SiR_2)_n\text{---}O\text{---}SiR_2\text{---}OX$$

wherein R is a member of the group consisting of alkyl and aryl radicals and X may be hydrogen or the group R, and $n$ is at least 50, with a non-toxic cross-linking agent of the group consisting of (a) organopolysiloxanes having a functionality of more than 2, (b) organohydrogenpolysiloxanes of the formula $$YSiH(R)\text{---}O\text{---}(SiH(R)\text{---}O)_n\text{---}SiH(R)Y$$

wherein Y is selected from the group consisting of hydroxy, alkoxy, aryloxy and amino groups, (c) the hydrolysis and alcoholysis products of silicon chloroform, (d) silanes of the formula $R_mSiY_{4-m}$ wherein Y is selected from the group consisting of hydroxy, alkoxy, aryloxy and amine groups and $m$ has a value from 0 to about 1.5, (e) tetraalkoxy silanes (f) alkyl polysilicates and (g) titanium alkyl esters, and a non-toxic condensation catalyst, introducing the paste immediately after being prepared into the oral cavity, maintaining the paste in position against that portion of the oral cavity of which an impression is desired for not more than 10 minutes at the body temperature of the mouth to permit the paste to solidify, and then removing the solidified paste from the oral cavity and from contact with the oral cavity surfaces against which it has hardened, whereby an accurate impression of a portion of the oral cavity is obtained.

2. Process in accordance with claim 1 wherein the catalyst is a member of the group consisting of organic acid metal salts, dialkyl metal salts of organic acids, metal chelates, metal oxides, organometal compounds, inorganic acids, organic acids, and organic bases.

3. Process in accordance with claim 1 wherein from 0.1% to 25% by weight of the non-toxic cross-linking agent is employed.

4. Process in accordance with claim 3 wherein a basic filler of the group consisting of zinc oxide, magnesium oxide, calcium carbonate and calcium sulfate is employed.

5. Process in accordance with claim 1 wherein the organopolysiloxane employed is dimethylpolysiloxane.

6. A process which comprises mixing a partially polymerized siloxane with an alkyl silicate of the group consisting of a tetramethyl, tetraethyl, tetrapropyl silicate and polysilicate, and a dialkyl tin salt of a carboxylic acid in the form of a paste, introducing the paste, immediately after being prepared, into the oral cavity, pressing the paste against that portion of the oral cavity of which an impression is to be made, maintaining the paste in position within the oral cavity for about ten minutes at mouth temperature while the paste solidifies, and thereafter removing the solidified and impressed paste from the oral cavity, whereby an accurate impression of a portion of the oral cavity is obtained.

7. The process of claim 6 wherein the partially polymerized siloxane has a viscosity of between about 15,000 and 35,000 centistokes.

8. The process of claim 6 wherein the siloxane is an alkylsiloxane and wherein the dialkyl tin salt is selected from the group consisting of dibutyl and diamyl tin dilaurate, dibutyl and diamyl tin maleate and dibutyl and diamyl tin diacetate.

9. The process of claim 6 wherein the siloxane is methylsiloxane and the dialkyl tin salt is dibutyl tin dilaurate.

10. The process of claim 6 wherein there is also included a filler selected from the group consisting of zinc oxide and calcium sulfate.

11. In a method for obtaining an accurate impression of a portion of the oral cavity, the improvement comprising employing as the impression material a mixture consisting essentially of a partially polymerized, difunctional, linear liquid organopolysiloxane having the general formula $XO\text{---}SiR_2\text{---}(O\text{---}SiR_2)_n\text{---}O\text{---}SiR_2\text{---}OX$ wherein R is selected from the group consisting of alkyl and aryl radicals and is selected from the group consisting of hydrogen and the group R, and $n$ is at least 50, with a non-toxic cross-linking agent of the grup consisting of (a) organopolysiloxanes having a functionality of more than 2, (b) organohydrogenpolysiloxanes of the formula $YSiH(R)\text{---}O\text{---}(SiH(R)\text{---}O)_n\text{---}SiH(R)Y$ wherein Y is selected from the group consisting of hydroxy, alkoxy, aryloxy and amino groups, (c) the hydrolysis and alcoholysis products of silicon chloroform, (d) silanes of the formula $R_mSiY_{4-m}$ wherein Y is selected from the group consisting of hydroxy, alkoxy, aryloxy and amine groups and $m$ has a value from 0 to about 1.5, (e) tetraalkoxy silanes, (f) alkyl polysilicates, and (g) titanium alkyl esters, and a non-toxic condensation catalyst.

References Cited in the file of this patent

UNITED STATES PATENTS

| | | |
|---|---|---|
| 2,311,158 | Conway | Feb. 16, 1943 |
| 2,516,155 | Slack | July 25, 1950 |
| 2,729,569 | Lipkind | Jan. 3, 1956 |
| 2,814,601 | Currie | Nov. 26, 1957 |
| 2,843,555 | Berridge | July 15, 1958 |

UNITED STATES PATENT OFFICE
CERTIFICATE OF CORRECTION

Patent No. 3,082,527                                            March 26, 1963

Siegfried Nitzsche et al.

It is hereby certified that error appears in the above numbered patent requiring correction and that the said Letters Patent should read as corrected below.

Column 12, line 54, for "radicals and is selected from the group consisting of hy-" read -- radicals and X is selected from the group consisting of hy- --.

Signed and sealed this 3rd day of December 1963.

(SEAL)
Attest:
ERNEST W. SWIDER

EDWIN L. REYNOLDS

Attesting Officer                                     Acting Commissioner of Patents